United States Patent [19]

Kinson

[11] 4,281,088
[45] Jul. 28, 1981

[54] NOVEL HALOBISPHENOLETHYLENE POLYCARBONATE-POLYESTER BLENDS

[75] Inventor: Philip L. Kinson, Clifton Park, N.Y.

[73] Assignee: General Electric Company, Schenectady, N.Y.

[21] Appl. No.: 180,351

[22] Filed: Aug. 22, 1980

Related U.S. Application Data

[63] Continuation of Ser. No. 52,279, Jun. 26, 1979, abandoned.

[51] Int. Cl.³ .............................................. C08L 69/00
[52] U.S. Cl. .................................... 525/439; 528/202
[58] Field of Search ......................... 525/439; 528/202

[56] References Cited

U.S. PATENT DOCUMENTS

| | | | |
|---|---|---|---|
| 2,465,319 | 3/1949 | Winfield et al. | 525/439 |
| 3,023,192 | 2/1962 | Shivers | 525/439 |
| 3,047,539 | 7/1962 | Pengilly | 525/439 |
| 3,248,366 | 4/1966 | Schmitt et al. | 528/202 |
| 3,470,114 | 9/1969 | Siggel et al. | 525/439 |
| 3,833,685 | 9/1974 | Wamback | 525/439 |
| 3,953,394 | 4/1976 | Fox et al. | 525/439 |
| 4,035,333 | 7/1977 | Kamada et al. | 525/439 |
| 4,044,073 | 8/1977 | Baron et al. | 525/439 |
| 4,061,691 | 12/1977 | Margotte et al. | 525/439 |
| 4,117,018 | 9/1978 | Cleveland | 528/202 |
| 4,124,652 | 11/1978 | Quinn et al. | 528/202 |
| 4,221,901 | 9/1980 | Cleveland et al. | 528/202 |
| 4,225,687 | 9/1980 | de Torres | 528/202 |

FOREIGN PATENT DOCUMENTS

2758577  7/1978  Fed. Rep. of Germany .......... 525/439
  48893 12/1964  Poland .

*Primary Examiner*—John C. Bleutge
*Assistant Examiner*—Arthur H. Koeckert
*Attorney, Agent, or Firm*—F. Wesley Turner; James C. Davis, Jr.; Joseph T. Cohen

[57] ABSTRACT

This invention is concerned with a new class of halobisphenolethylene polycarbonate-polyester blends. More particularly, the invention is concerned with halobisphenolethylene polycarbonate-polyester blends which exhibit enhanced physical and/or chemical properties. The halobisphenolethylene polycarbonate-polyester blends are suitable for the manufacture of filaments, fibers, films, sheets, laminates and articles of manufacture including reinforced articles by conventional manufacturing techniques.

5 Claims, No Drawings

NOVEL HALOBISPHENOLETHYLENE POLYCARBONATE-POLYESTER BLENDS

This is a continuation, of application Ser. No. 052,279, filed June 26, 1979, now abandoned.

CROSS-REFERENCES TO RELATED APPLICATIONS

This invention is related to copending U.S. patent applications which contain subject matter incorporated herein by reference in its entirety, i.e. Ser. No. 051,766 (D. P. Thomas) filed June 25, 1979; and Ser. No. 955,034 filed Oct. 27, 1978 (P. L. Kinson & D. P. deTorres), a continuation-in-part of Ser. No. 830,860, filed Sept. 6, 1977 now abandoned, a continuation of Ser. No. 672,415, filed Mar. 31, 1976 now abandoned.

BACKGROUND OF THE INVENTION

1. Field of the Invention

This invention relates to a new class of halobisphenolethylene polycarbonate-polyester blends.

2. Description of the Prior Art

The prior art has made limited observations regarding the properties of chlorobisphenolethylene polycarbonates such as the infra-red spectroscopic data by Z. Wielgosz, A. Boranowska and K. Janicka, reported in *Plaste und Kautschuk* 19 (12) 902 (1972). Observations regarding attempts to stabilize chlorobishenolethylene polycarbonates are reported by Z. Gobiczewski, Z. Wielgosz and K. Janicka in *Plaste und Kautschuk* 16 (2) 99 (1969)

DESCRIPTION OF THE INVENTION

This invention embodies halobisphenolethylene polycarbonate-polyester blends.

As used herein and in the appended claims, the term "halobisphenolethylene polycarbonate" includes any polycarbonate composition containing within the polycarbonate skeletal backbone "halobis(phenyl)ethylene carbonate" units of the formula:

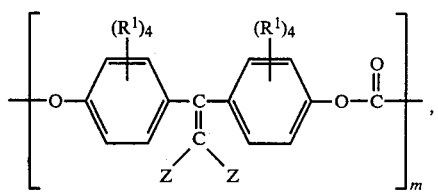

where independently each $R^1$ is hydrogen, chlorine, bromine, or a $C_{1-30}$ monovalent hydrocarbon or hydrocarbonoxy, each Z is hydrogen, chlorine, or bromine, subject to the proviso that at least one Z is chlorine or bromine, and m is an integer of at least 2. Presently preferred monovalent hydrocarbon groups are $C_{1-4}$ alkyl or phenyl. More preferred polycarbonates contain units of formula I, wherein each $R^1$ is hydrogen and each Z is chlorine. Polycarbonates containing only recurring moieties of formula I are halobisphenolethylene homopolycarbonates as defined herein in the appended claims.

Included within the scope of this invention are halobisphenolethylene polycarbonates containing both halobis(phenyl)ethylene carbonate units of formula I as well as "arene carbonate" units of the formula:

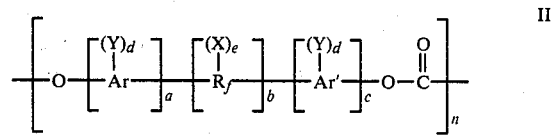

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, d represents a whole number of at least 0 up to a maximum equivalent to the number of replaceable hydrogens substituted on the aromatic rings comprising Ar or Ar', e represents a whole number of from 0 to a maximum controlled by the number of replaceable hydrogens on $R_f$, a, b and c represent whole numbers including 0, when b is not zero, neither a or c may be zero, otherwise either a or c but not both may be 0, when b is zero, the aromatic groups can be joined by direct carbon bonds and wherein n is an integer of at least 1.

Preferred copolycarbonates included within the scope of this invention are polycarbonates containing both the halobis(phenyl)ethylene carbonate units of formula I as well as arene carbonate units of the formula:

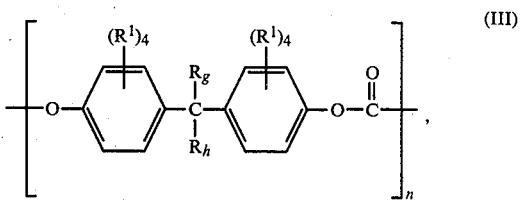

wherein independently each $R^1$ is hydrogen, chlorine, bromine or a $C_{1-30}$ monovalent hydrocarbon group, independently $R_g$ and $R_h$ are hydrogen or a $C_{1-30}$ monovalent hydrocarbon group and n is an integer of at least 2. Presently preferred monovalent hydrocarbon groups are $C_{1-4}$ alkyl or phenyl. More preferred copolycarbonates contain bisphenyl carbonate units of formula III wherein each $R^1$ is hydrogen and $R_g$ and $R_h$ are methyl.

Halobisphenolethylene polycarbonates can be prepared by methods known to those skilled in the art such as those described by S. Porejko et al., Polish patent 48,893, issued Dec. 12, 1964, entitled *Process for Synthesizing Self-Extinguishing Thermoplastics* and Z. Wielgosz et al., *Polimery* 17, 76 (1972). In general, this S. Porejko et al. and Z. Wielgosz et al. methods describe reactions of a chlorobisphenolethylene, i.e. 1,1-dichloro-2,2-bis(4-hydroxyphenyl)ethylene and bisphenol-A, i.e. bis(4-hydroxyphenyl)-propane-2,2 mixture with a carbonate precursor, e.g. phosgene and an acid acceptor, e.g. caustic soda and a catalyst, e.g. triethylamine, wherein the reactions are carried out under conventional phosgenating reaction conditions, i.e. reaction conditions generally associated with the phosgenation of bisphenol-A as described in the Encyclopedia of Polymer Science and Technology 10 entitled *Polycarbonates,* pages 710–764, Interscience Publishers (1969).

Illustrative of some halobisphenolethylenes that can be employed in the preparation of homo- and co-polycarbonates in accordance with the phosgenating reaction conditions described by S. Porejko et al. and Z. Wielgosz et al. as well as those described in the Encyclopedia of Polymer Science follow:

1,1-dibromo-2,2-bis(4-hydroxyphenyl)ethylene;
1,1-dichloro-2,2-bis(5-methyl-4-hydroxyphenyl)-ethylene;
1,1-dibromo-2,2-bis(3,6-n-butyl-4-hydroxyphenyl)-ethylene;
1,1-dichloro-2,2-bis(2-chloro-5-ethyl-4-hydroxyphenyl)ethylene;
1,1-dibromo-2,2-bis(2,5-dibromo-4-hydroxyphenyl)-ethylene;
1-bromo-2,2-bis(4-hydroxyphenyl)ethylene;
1-chloro-2,2-bis(3,5-di-isopropyl-4-hydroxyphenyl)-ethylene;
1-bromo-2,2-bis(2,6-di-t-butyl-4-hydroxyphenyl)-ethylene;
1-chloro-2,2-bis(2,6-dichloro-4-hydroxyphenyl)-ethylene;
1-bromo-2,2-bis(2,3-dibromo-4-hydroxyphenyl)ethylene;
1,1-dichloro-2,2-bis(3,5-dichloro-4-hydroxyphenyl)-ethylene;
1,1-dichloro-2,2-bis(3,5-dibromo-4-hydroxyphenyl)-ethylene;
1,1-dibromo-2,2-bis(5-chloro-4-hydroxy)ethylene;
1-chloro-2,2-bis(3,6-dibromo-4-hydroxyphenyl)ethylene;
1-bromo-2,2-bis(2-chloro-4-hydroxyphenyl)ethylene;
1,1-dichloro-2,2-bis(2,3,5-trichloro-4-hydroxyphenyl)-ethylene;
1,1-dibromo-2,2-bis(2,3,5,6-tetrabromo-4-hydroxyphenyl)ethylene;
1-chloro-2,2-bis(3-phenyl-4-hydroxyphenyl)ethylene;
1-bromo-2,2-bis(3,5-diphenyl-4-hydroxyphenyl)ethylene;
1,1-dichloro-2,2-bis(2,6-diphenyl-4-hydroxyphenyl)-ethylene;
1,1-dibromo-2,2-bis(3-bromo-5-phenyl-4-hydroxyphenyl)ethylene;
1-chloro-2,2-bis(3-methoxy-4-hydroxyphenyl)ethylene;
1-bromo-2,2-bis(3,5-dimethoxy-4-hydroxyphenyl)-ethylene;
1,1-dichloro-2,2-bis(2-ethoxy-4-hydroxyphenyl)-ethylene;
1,1-dibromo-2,2-bis(2,6-diethoxy-4-hydroxyphenyl)-ethylene;
1-chloro-2,2-bis(5-phenylether-4-hydroxyphenyl)-ethylene;
1-bromo-2,2-bis(3,5-diphenylether-4-hydroxyphenyl)-ethylene;
1,1-dichloro-2,2-bis(3-chloro-5-phenylether-4-hydroxyphenyl)ethylene;
1,1-dibromo-2,2-bis(2-bromo-5-phenylether-4-hydroxyphenyl)ethylene; etc., among many others.

Illustrative of some arene dihydroxy compounds that can be employed in the preparation of halobisphenolethylene copolycarbonates or in the preparation of other polycarbonates that contain arene carbonate units of formulas II and III—other polycarbonates that can be combined with the halobisphenolethylene polycarbonate-polyester blends of this invention—follow:

resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4-dihydroxy-diphenyl-2,2(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-4-fluorophenylmethyl methane;
4,4'-dihydroxy-diphenyl-2-naphthylmethyl methane;
4,4'-dihydroxy-tetraphenyl methane;
4,4'-dihydroxy-diphenyl phenylcyano methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-diphenyl;
α,α,α',α'-tetramethyl-α,α'-(di-p-hydroxyphenyl)-p-xylylene;
α,α,α',α'-tetramethyl-α,α'-(di-p-hydroxyphenyl)-m-xylylene;
2,2'-dihydroxy-3,3',5,5'-tetramethyldiphenyl methane;
4,4'-dihydroxy-3,3'-dimethyl-diphenyl methane;
4,4'-dihydroxy-2,2'-dimethyl-diphenyl methane;
4,4'-dihydroxy-3,3',5,5'-tetramethyl-diphenyl methane;
4,4'-dihydroxy-3,3'-dichloro-diphenyl methane;
4,4'-dihydroxy-3,3'-dimethoxy-diphenyl methane;

4,4'-dihydroxy-2,2',5,5'-tetramethyl-diphenyl methane;
4,4'-dihydroxy-2,2',3,3',5,5',6,6'-octamethyldiphenyl methane;
4,4'-dihydroxy-2,2'-dimethyl-5,5'-diisopropyldiphenyl methane;
4,4'-dihydroxy-2,2'-dimethyl-5,5'-dipropyl-diphenyl methane;
4,4'-dihydroxy-2,2'-dimethyl-5,5'-di-tert.-butyldiphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-3,3'-dimethyl-diphenyl-3,3-butanone-2;
4,4'-dihydroxy-diphenyl-4,4-hexanone-3;
4,4'-dihydroxy-diphenylmethyl-4-methoxy-phenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
4,4'-dihydroxy-3,3',5,5'-tetramethyl-diphenyl methane;
4,4'-dihydroxy-3,3',5,5'-tetrachloro-diphenyl-1,1-cyclohexane;
4,4'-dihydroxy-3,3',5,5'-tetrachloro-diphenyl-2,2-propane;
4,4'-dihydroxy-3,3',5,5'-tetramethyl-2,2',6,6'-tetrabromo-diphenyl-2,2-propane; and
4,4'-dihydroxy-3,3',5,5'-tetrabromo-diphenyl-2,2-propane, etc., among many others.

Presently preferred halobisphenolethylene polycarbonates exhibit an intrinsic viscosity of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful halobisphenolethylene polycarbonates generally have an intrinsic viscosity within the range of from about 0.38 to about 0.7 dl./g. Preferably, the halobisphenolethylene polycarbonates contain a sufficient number of repeating units of formulas I, or I and II, or III, set out hereinbefore, to give a number average molecular weight of homo- or copolycarbonates—including blends thereof with other polycarbonates—of at least about 5,000, and more preferably a number average molecular weight of from about 10,000 to about 50,000. Polycarbonates of such molecular weight characteristics process easily inbetween about 450° F. and 650° F.

As used herein and in the appended claims, the term "polyester" includes any thermoplastic polyester composition. Illustratively the polyester can be (A) a polyalkylene terephthalate resin or a copolyester thereof containing a minor amount of an aliphatic or another aromatic dicarboxylic acid and/or another aliphatic diol or polyol, and/or (B) a segmented copolymer comprising a multiplicity of recurring intralinear long chain etherester and short chain ester units.

The polyalkylene terephthalate resin, hereafter sometimes referred to as PAT illustratively can be any resin comprising high molecular weight poly(1,4-alkylene terephthalate) having repeating units of the general formula:

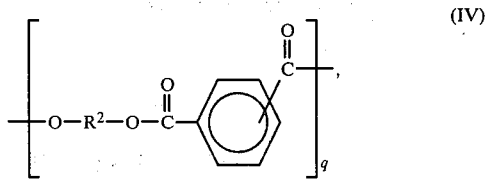

where $R^2$ represents a divalent alkylene radical containing from 1 to 50, preferably 1–10 carbon atoms, q being a number in excess of 1, preferably 10 to 10,000 or more, and the two carbonyl groups are located on the aromatic ring in a para- or metaposition relative to each other. Presently preferred polyesters are poly(1,4-butylene terephthalate) including copolyesters, i.e. where $R^2$ represents a divalent alkylene radical containing from 1 to 50, preferably 1–10 carbon atoms, q being a number in excess of 1, preferably 10 to 10,000 or more, and the two carbonyl groups are located on the aromatic ring in a para- or meta-position relative to each other. Presently preferred polyesters are poly(1,4-butylene terephthalate) including copolyesters, i.e. esters that contain a minor amount, e.g. from about 0.5 to about 2% by weight, of repeating units derived from an aliphatic or another aromatic dicarboxylic acid and/or another aliphatic diol or polyol. Among the units which can be present in the copolyesters are those derived from aliphatic dicarboxylic acids, e.g. acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g. acids having up to about 36 carbon atoms, such as isophthalic acid and the like. In addition to the PBT, i.e. poly(1,4-butylene terephthalate) units derived from 1,4-butylene glycol, there can also be minor amounts of units derived from other aliphatic glycols and polyols, e.g. di- and polyols having up to about 50 carbon atoms, including ethylene glycol, propylene glycol, cyclohexanediol, and the like. Such copolyesters can be made by techniques well-known to those skilled in the art including techniques taught by Winfield et al., U.S. Pat. Nos. 2,465,319; Pengilly, 3,047,539, among others.

Illustratively, a high molecular weight PBT polyester will have an intrinsic viscosity of at least 0.2 and preferably about 0.8 deciliters per gram (dl./g.) as measured in o-chlorophenol, a 60/40 phenol-tetrachloroethane mixture or a similar solvent at 25°–30° C. The upper intrinsic viscosity limit is not critical, however will generally be about 2.5 dl./g. Especially preferred PBT polyesters will have an intrinsic viscosity within the range of from about 0.5 to about 1.3.

Included within the expression "segmented copolymer" hereafter sometimes referred to as a "segmented thermoplastic copolyester elastomer" and abbreviated as STPE, can be any polyester comprising a multiplicity of recurring intralinear "long chain ether-ester" and "short chain ester" units wherein the ether-ester units are represented by the formula:

$$-O-G-O-\overset{O}{\underset{\|}{C}}-R^3-\overset{O}{\underset{\|}{C}}-, \quad (V)$$

wherein G is a radical remaining after removal of the terminal hydroxyl groups from a difunctional polyether glycol having a molecular weight in the range of from about 350 to about 6,000, $R^3$ is a hydrocarbon radical remaining after removal of the carboxyl groups from a dicarboxylic acid and the ester units are represented by the formula:

$$-O-R^4-O-\overset{O}{\underset{\|}{C}}-R^3-\overset{O}{\underset{\|}{C}}-, \quad (VI)$$

wherein $R^4$ is a hydrocarbon radical remaining after removal of the hydroxyl groups from an organic diol, $R^3$ being as defined above, at least one of the radicals $R^3$ and $R^4$ being a divalent aromatic radical having the free valences attached directly to an aromatic ring, the radicals $R^3$ and $R^4$ being so selected that the structure $$-O-R^4-O-\overset{O}{\underset{\|}{C}}-R^3-\overset{O}{\underset{\|}{C}}-,$$

represents a repeating unit of a polyester having a melting point of at least above 200° C.

Presently preferred segmented thermoplastic copolyester elastomers comprise an elastomer consisting essentially of a multiplicity of recurring intralinear long chain ether-ester and short chain ester units connected head-to-tail through ester linkages, wherein the long chain ester units are represented by at least one of the following structures:

$$-O-G_1-O-\overset{O}{\underset{\|}{C}}-R_1-\overset{O}{\underset{\|}{C}}- \text{ and} \quad (a)$$

$$-O-G_2-O-\overset{O}{\underset{\|}{C}}-R_2-\overset{O}{\underset{\|}{C}}-, \quad (b)$$

wherein independently each $G_1$ and $G_2$ is a divalent radical remaining after removal of terminal hydroxyl groups from a long chain polymeric glycol, i.e., a glycol having a molecular weight above about 350 and melting point below about 55° C., and wherein the short chain ester units are represented by at least two of the following structures:

$$-O-D_1-O-\overset{O}{\underset{\|}{C}}-R_1-\overset{O}{\underset{\|}{C}}-, \quad (c)$$

$$-O-D_1-O-\overset{O}{\underset{\|}{C}}-R_2-\overset{O}{\underset{\|}{C}}-, \quad (d)$$

$$-O-D_2-O-\overset{O}{\underset{\|}{C}}-R_1-\overset{O}{\underset{\|}{C}}-, \quad (e)$$

$$\text{and } -O-D_2-O-\overset{O}{\underset{\|}{C}}-R_2-\overset{O}{\underset{\|}{C}}-, \quad (f)$$

wherein $R_1$ and $R_2$ are different divalent radicals remaining after removal of carboxyl groups from different dicarboxylic acids each having a molecular weight less than about 300, and $D_1$ and $D_2$ are different divalent radicals remaining after removal of hydroxyl groups from different low molecular weight diols, i.e. diols having molecular weights of less than about 250. Any method known to those skilled in the art can be employed in the preparation of an STPE including those set out in Shivers, Jr. et al., U.S. Pat. Nos. 3,023,192 and Witsiepe, 3,651,014, among others.

The method of preparing STPE polymers described by Shivers, Jr. and Witsiepe are hereby incorporated herein in their entirety by reference for the purpose of describing the specific procedures and the specific reactants which can be employed in the preparation of the segmented copolymers employed in the practice of this invention. Commercially available segmented copolymers well-known to those skilled in the art are marketed by the E. I. du Pont de Nemours and Co., under the trade name Hytrel ® (e.g. Hytrel ® 4055, 5555, 6350, etc.).

Blends of halobisphenolethylene polycarbonates and polyesters, as described hereinbefore, can be prepared by any means known to those skilled in the art. Preferred blends are prepared by heating admixtures of a halobisphenolethylene polycarbonates and polyesters to a temperature above their softening point(s). Preferably, the mixing or blending is carried out—when carried out in the absence of a solvent—at the aforesaid elevated temperature, i.e. above their softening point(s), while subjecting the admixture to mechanical working. Accordingly, blends can be mixed with such equipment as extruders including mono- and multiple screw types, internal Banbury mixers, roll mills, or any other mechanical equipment which will subject the admixture to shear stresses at elevated temperatures.

In general, the halobisphenolethylene polycarbonatepolyester compositions of this invention can contain other ingredients such as reinforcing and nonreinforcing fillers, mold release agents, ultraviolet light stabilizers, antioxidants, drip retarding agents, surfactant agents, etc.

The halobisphenolethylene polycarbonates and polyesters are combinable with each other in all proportions. Consequently, compositions comprising from 1 to 99%, by weight, halobisphenolethylene polycarbonate and from 99 to 1%, by weight, polyesters are included within the scope of the invention. By controlling the proportions of halobisphenolethylene polycarbonate and polyesters formulations having predetermined properties which are improved over those of either a halobisphenolethylene polycarbonate or a polyester alone are readily obtained. In general, blends of halobisphenolethylene polycarbonate and polyesters have substantially enhanced flame retardancy values wherein nominal amounts 1 to 50%, by weight, of halobisphenolethylene polycarbonates are combined with 99 to 50%, by weight, of polyesters while still retaining or improving substantially the physical and chemical polymer property profile associated with the polyester component of the blends.

The following examples illustrate—but do not limit—the best method of practicing the invention. Unless otherwise indicated in the examples, the following general procedures were employed in the preparation and testing of the halobisphenolethylene polycarbonate-polyester blends. Deviations from the general procedure are noted in the specific examples.

GENERAL PROCEDURE

A series of blends of chlorobisphenolethylene polycarbonates and polyester were prepared from noncommercially available material and commercial available materials, respectively. The chlorobisphenol polycarbonate (abbreviated in the examples as bisphenol-E polycarbonate) was prepared by the reaction of an aqueous alkaline solution of 1,1-dichloro-2,2-bis(4-hydroxyphenyl)ethylene (prepared as described hereafter) with phosgene carried out in the presence of triethylamine and methylene chloride at a temperature range of from about 20° to about 40° C. to form high molecular weight chlorobisphenolethylene polycarbonates having an intrinsic viscosity as measured in methylene chloride at a temperature of 25.3° C. within the range of from about 0.41 to 0.54.

The 1,1-dichloro-2,2-bis(4-hydroxyphenyl)ethylene employed was prepared in accordance with the following detailed description: Under nitrogen, methanol (16.2 liters) was charged to a 10 gallon stainless steel reactor. Flake KOH (4098 gm., 85% solids, 62.1 moles) was added over 20 minutes with cooling to keep the temperature below 45° C. After cooling to 17° C., 1,1,1-trichloro-2,2-bis(4-hydroxyphenylethane) (3804 gm., 12 moles) was added as a powder. The stirred reaction mixture was then held at 27°–30° C. for 5 days (resulting in a starting material level of 3%) and then heated to reflux (75° C.) for two hours to lower the starting material level to several hundred ppm. After cooling to 25° C. the material was transferred under nitrogen to two 22 liter glass flasks and acidified to a pH of 5 with concentrated HCl (4320 ml.). The material was then split into two equal halves. One of the halfs was then heated to near reflux and 7.5 liters of water at 75° C. was added. The resulting mixture was cooled to 25° C. over 3 hours and the resulting reaction product crystals were collected in a basket centrifuge and washed with 12 liters of water to dissolve and remove KCl which had also crystallized from the mother-liquor. The resulting product was redissolved in 4 liters of methanol, filtered through a 0.2 micron millipore filter, heated to 75° C. and 4 liters of hot water were added. After cooling, the crystals were collected in a basket centrifuge, washed with 4 liters of water, and dried in a vacuum oven at 100° C. to afford 150 gm., an 89% yield of product, i.e. 1,1-dichloro-2,2-bis(4-hydroxyphenyl)ethylene. Liquid chromatography analysis indicated less than 150 ppm. starting material. Product nitrogen content was less than 5 ppm. and iron was less than 0.5 ppm.

The resulting bisphenol-E polycarbonate and polyesters were powder blended into a series of compositions, extruded and chopped into pallets. The pelleted materials were injection or compression molded and tested accordingly:

Notched Izod Impact ($\frac{1}{8}$" specimens, ft.-lbs. per inch of notch) ASTM D256 method A;
Oxygen Index ASTM D2863;
Tensile Yield Stress (psi) ASTM D1822; L specimen, 0.5"/min.;
Flexural Strength (psi) ASTM D790.

EXAMPLES 1–3

Bisphenol-E polycarbonate and polyethyleneterephthalate, a commercial product of General Electric Company, were blended and tested in accordance with the description of the General Procedure. The resutls of the test are tabulated in Table I set out hereinafter.

TABLE I

| Composition and Mechanical Properties of Bisphenol-E and Polyethylene Terephthalate | | | |
|---|---|---|---|
| Example No. | 1 | 2 | 3 |
| I. Blend Composition | | | |
| (a) bisphenol-E, phr (1) | 0 | 25 | 100 |
| (b) polybutylene terephthalate, (2) phr | 100 | 75 | 0 |
| II. Physical Properties | | | |
| (a) notched Izod impact | 0.53 | 0.51 | 16 |
| (b) oxygen index | 24.3 | 28.6 | 54.9 |
| (c) tensile yield stress | 7690 | 8780 | 10040 |
| (d) flexural strength | 10080–16146 | 8520 | 16340 |

(1) phr = parts per hundred of polycarbonate resin
(2) Valox ® Polyester

EXAMPLES 4–8

Bisphenol-E polycarbonate and a polybutylene terephthalate, a commercial product of General Electric Company, were blended and tested in accordance with the description of the General Procedure. The results of the tests are tabluated in Table II set out hereafter.

TABLE II

| Composition and Mechanical Properties of Bisphenol-E and Polybutylene Terephthalate | | | | | |
|---|---|---|---|---|---|
| Example No. | 4 | 5 | 6 | 7 | 8 |
| I. Composition | | | | | |
| (a) bisphenol-E, phr(1) | 0 | 25 | 50 | 90 | 100 |
| (b) polybutylene terephthalate, (2) phr | 100 | 75 | 50 | 10 | 0 |
| II. Physical Properties | | | | | |
| (a) notched Izod impact(2) | 0.84 | 0.58 | 0.56 | 1.8 | 16 |
| (b) oxygen index | 21 | 21 | 28 | 53 | 54.8 |
| (c) tensile yield stress | 6470 | 6541 | 8650 | 9910 | 10040 |
| (d) flexural strength | 12460 | 122.0 | 13280 | 16450 | 16340 |

(1)phr = parts per hundred of polycarbonate resin
(2)Valox ® Polyester

The halobisphenolethylene polycarbonate-polyester blends are suitable for the manufacture of filaments, fibers, films, sheets, laminates and articles of manufacture including reinforced articles by conventional manufacturing techniques.

It will be apparent to those skilled in the art that other changes and modifications can be made in the particular embodiments of the invention described herein and said modifications and embodiments are within the full intended scope of the invention as defined by the appended claims.

I claim:

1. A polymer blend comprising:
   (I) about 1-99 parts by weight of a polycarbonate containing halobis(phenyl)ethylene carbonate units of the formula:

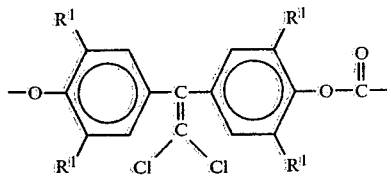

where independently each $R^1$ is hydrogen, $C_{1-4}$ alkyl or phenyl, and having an intrinsic viscosity of 0.38 to 0.7 deciliters per gram, and
   (II) about 99-1 parts by weight of a poly(1,4-alkylene terephthalate) having an intrinsic viscosity of 0.5 to 1.3 deciliters per gram.

2. The claim 1 composition where each $R^1$ is a hydrogen.

3. The claim 2 composition where the terephthalate is poly(1,4-butylene terephthalate).

4. The claim 1 composition containing about 1-50 parts of a polycarbonate containing halobis(phenyl)ethylene carbonate units, and about 99-50 parts of poly(1,4-butylene terephthalate).

5. The claim 1 composition containing about 25-90 parts by weight of a polycarbonate containing halobis(phenyl)ethylene carbonate units, and about 75-10 parts by weight of a poly(1,4-butylene terephthalate).

* * * * *